J. E. YORK.
ROLLING MILL.
APPLICATION FILED AUG. 17, 1905.

933,812.

Patented Sept. 14, 1909.
5 SHEETS—SHEET 1.

WITNESSES:
Fred White
René Bruine

INVENTOR:
James E. York,
By Attorneys,
Arthur E. Chasent Co.

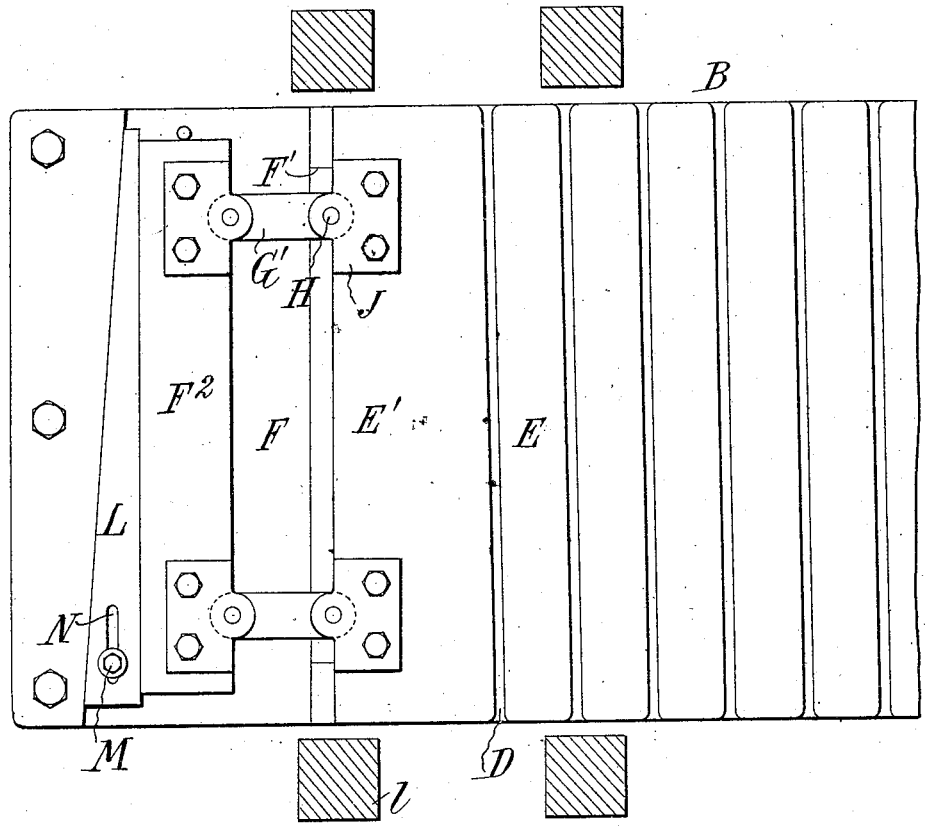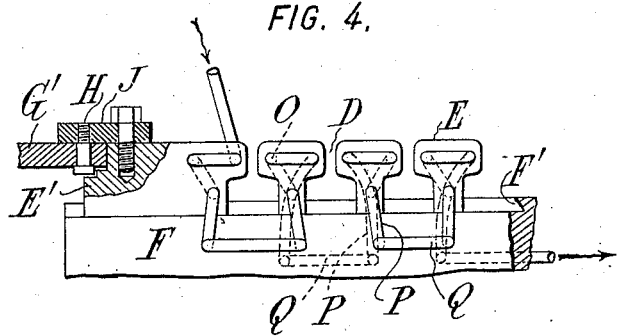

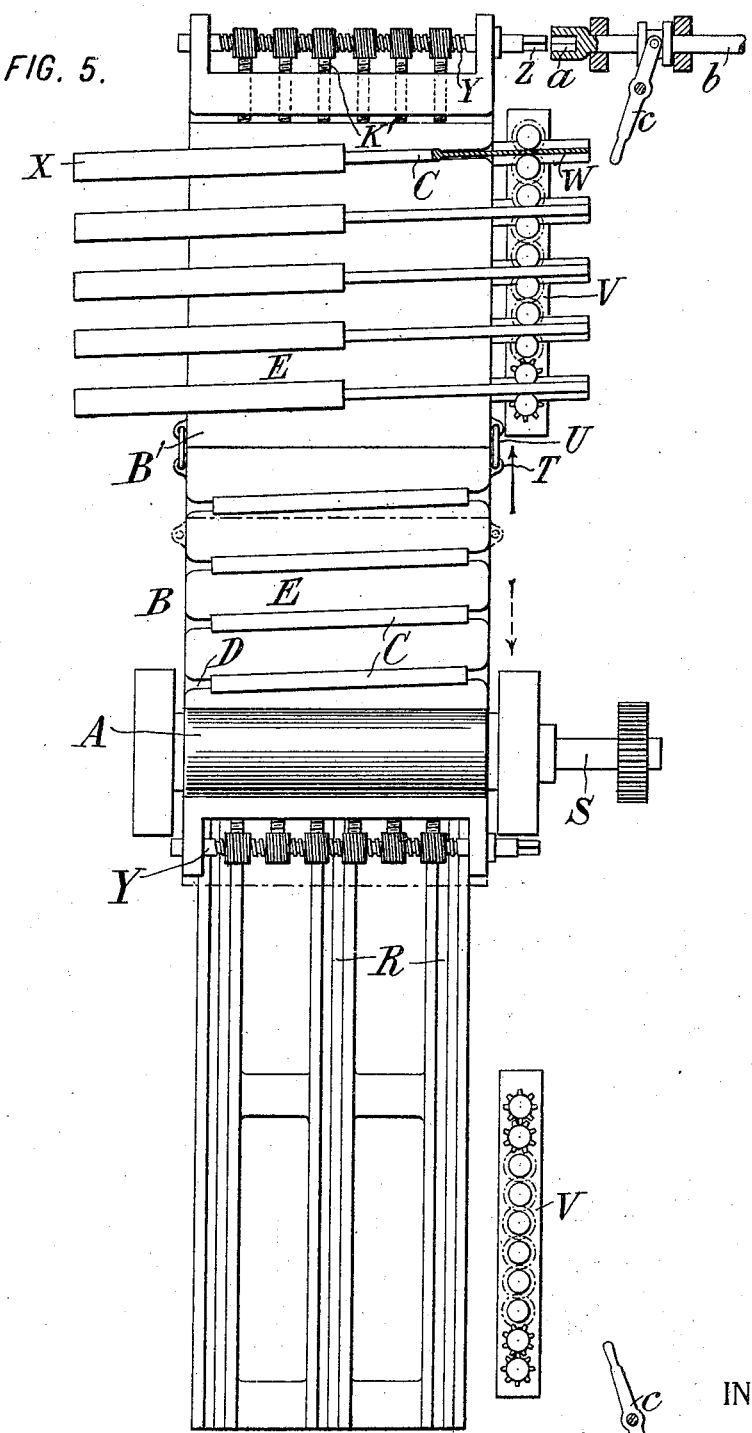

J. E. YORK.
ROLLING MILL.
APPLICATION FILED AUG. 17, 1905.

933,812.

Patented Sept. 14, 1909.
5 SHEETS—SHEET 4.

WITNESSES:
Fred White
René Bruine

INVENTOR:
James E. York,
By Attorneys,
Arthur E. Frauer

J. E. YORK.
ROLLING MILL.
APPLICATION FILED AUG. 17, 1905.
933,812.
Patented Sept. 14, 1909.
5 SHEETS—SHEET 5.
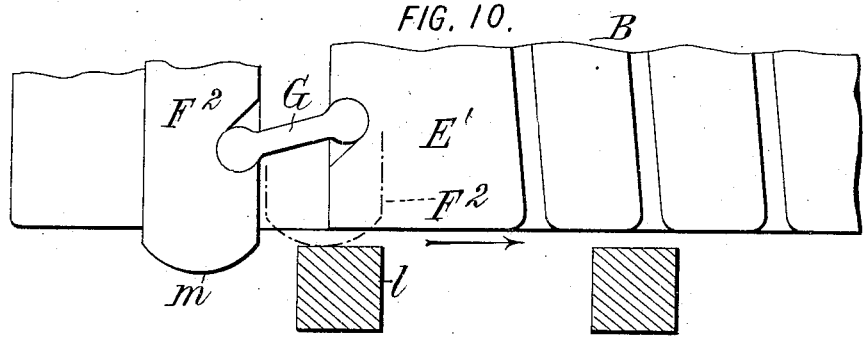
FIG. 10.
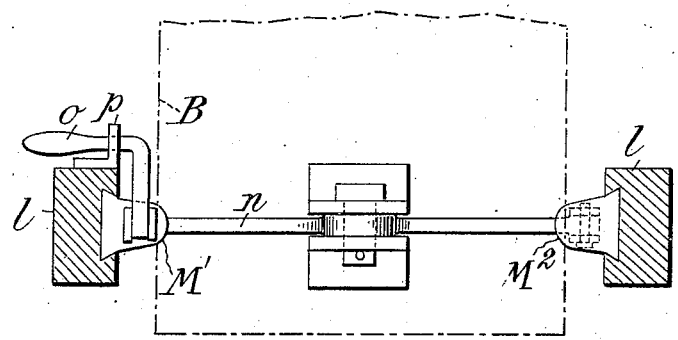
FIG. 11.
FIG. 13.
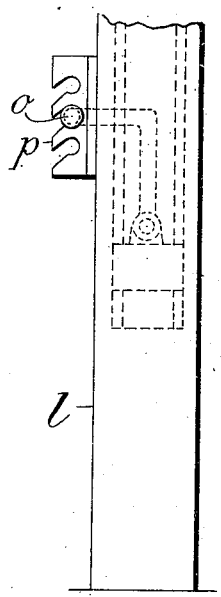
FIG. 12.
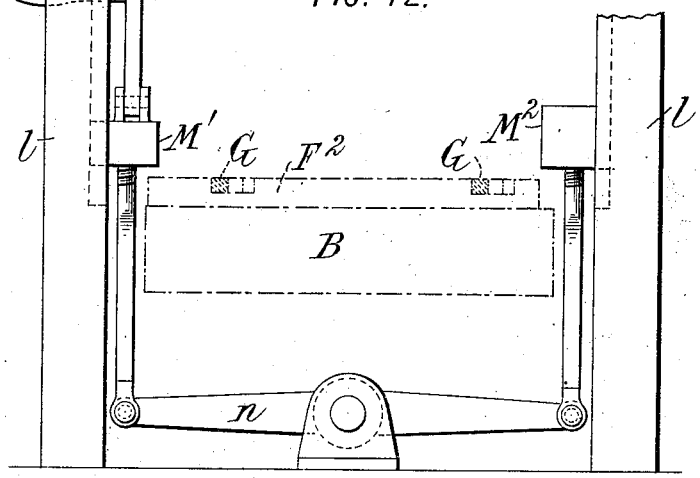
WITNESSES:
René Muine
Theodore T. Snell.
INVENTOR:
James E. York,
By Attorneys,
Arthur E. Fraser

UNITED STATES PATENT OFFICE.

JAMES E. YORK, OF NEW YORK, N. Y.

ROLLING-MILL.

933,812.　　　　Specification of Letters Patent.　　Patented Sept. 14, 1909.

Application filed August 17, 1905.　Serial No. 274,516.

*To all whom it may concern:*

Be it known that I, JAMES E. YORK, a citizen of the United States, residing in the borough of Brooklyn, county of Kings, city and State of New York, have invented certain new and useful Improvements in Rolling-Mills, of which the following is a specification.

In my applications for Patent No. 177,989 filed October 21, 1903, and No. 236,354 filed December 10, 1904, I have described the forming or spreading of a flange upon an elongated shape by rolling the same laterally, and a suitable apparatus for carrying out such process.

The present invention provides certain improved features for such apparatus, and also certain improvements applicable to rolling mills generally.

The accompanying drawings illustrate embodiments of the invention.

Figure 1:
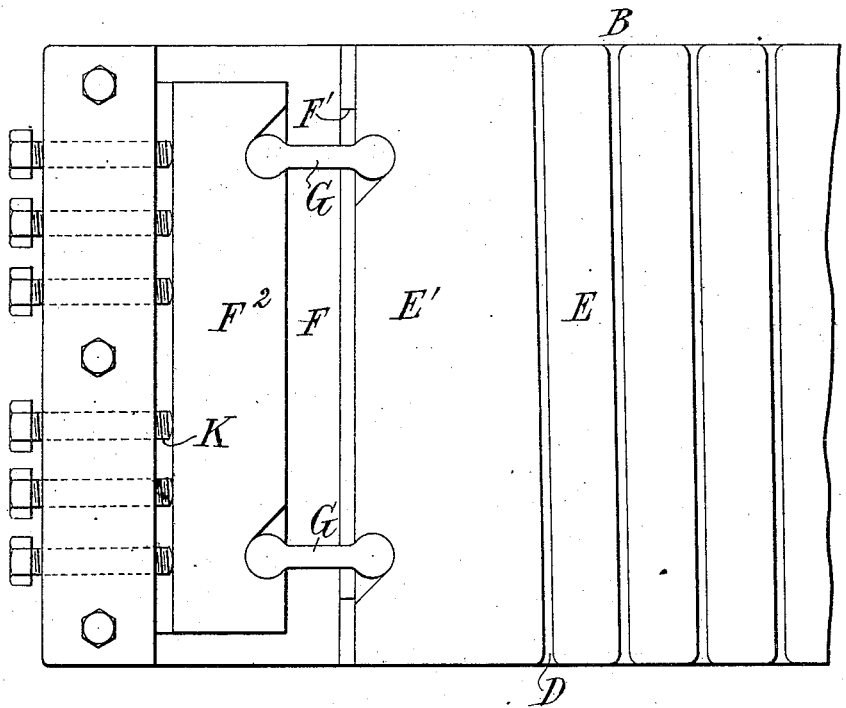
Figure 2:
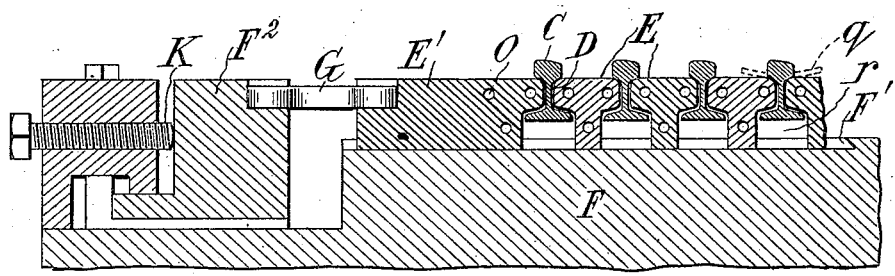
Figure 6:
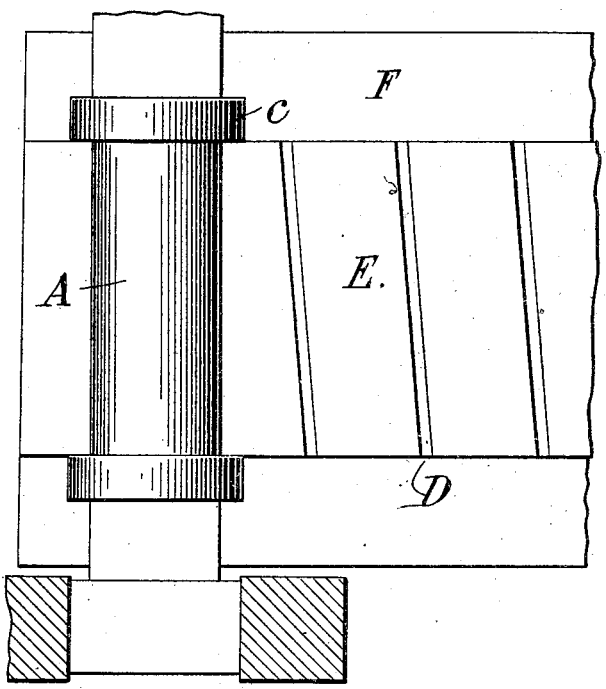
Figure 7:
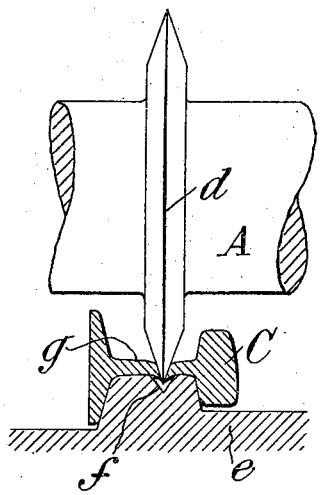
Figure 8:
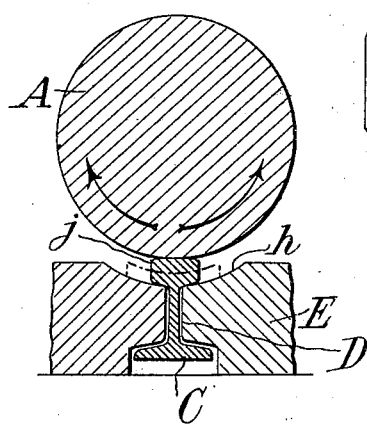
Figure 9:
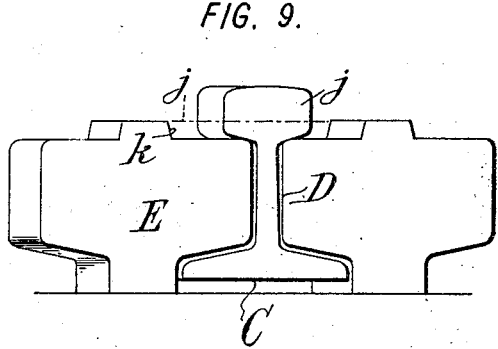

Figure 1 is a plan of a bed or carrier; Fig. 2 is a longitudinal section thereof; Fig. 3 is a plan of another type; Fig. 4 is a side elevation of the upper portion thereof; Fig. 5 is a plan illustrating more or less diagrammatically a suitable arrangement of the parts of a complete mill; Fig. 6 is a plan of the central portion of another type; Fig. 7 is a cross-section illustrating a type of mill suitable for dividing the web of a rail; Fig. 8 is a longitudinal section showing the adaptation of the mill to the forming of a concave flange; Fig. 9 is a side elevation of a carrier constructed to limit the width of the flange to be formed. Fig. 10 is a diagrammatic plan of a convenient device for operating the mechanism for pressing the sections together; Figs. 11, 12 and 13 are respectively a plan, side elevation, and end elevation of another device for accomplishing the same purpose.

The principal parts of the apparatus are a roll A (Fig. 5) vertically adjustable and rotatable as in ordinary rolling mills, and one or more beds or carriers which I indicate as a whole by the letter B, and which are arranged to reciprocate beneath the roll A. Elongated shapes, such for example as the railway rails C, are carried by said bed in positions transverse to the direction of its movement, so that the exposed portions of said shapes (the heads of the rails in the present instance) are spread laterally upon the bed as a support to form the flange, or to spread a flange or head originally presented.

The elongated shapes are introduced preferably by shoving them endwise into the grooves D, which hold them firmly in the desired position. Preferably for greater ease in introducing and withdrawing the elongated shapes, the bed is composed of any desired number of separable sections E mounted upon a base F (Figs. 2 and 4), the sections being free to move toward each other, that is, longitudinally of the bed as a whole, and being held against lateral movement by tongues on the bottoms of the sections running in a broad longitudinal groove upon the top of the base F in the manner illustrated in detail in my aforesaid applications, the edge of said groove being marked F'.

In the aforesaid applications it is proposed to press the sections E together by means of a cable connected to the roll. One feature of improvement in the present case is in the elimination of the roll and the providing of an independent means for pressing the sections together, thus simplifying and rendering this operation more accurate, and at the same time avoiding interference with the proper operation of the roll.

Figs. 1 and 3 represent one end of a bed or carrier B. We may suppose the section at the opposite end to be fixed, or be likewise provided with adjusting mechanism. In order that the sections shall all be moved quickly to their final positions, a device is provided for moving them through a fixed distance; and in order that their final positions may be varied to compensate for different thickness of the shapes, means are provided for adjusting such final position. For example a double toggle or parallel motion is shown comprising a slide F² connected to the end section E' of the bed by means of links G having circular heads which drop into corresponding recesses in the slide F² and section E', or links G' (Fig. 3) may be used, fastened by pins H to plates J on the slide and section respectively. A very slight movement is needed to press the sections together, or to release them and allow the finished shapes to be pushed out of the grooves. Adjustability may be obtained by providing any desired number of adjusting bolts K forming a bearing for the slide F² at the side thereof opposite the toggle links G, or by providing a wedge L (Fig. 3) which serves the same purpose, and which is held in position of adjustment by a bolt M working in a slot N. The entire pressing movement may in fact be effected by the adjustable devices alone, that is to say, by the bolts K or the wedge L.

In order to prevent too great expansion of the sections E by the heat of the rails, they are preferably provided with passages O through which a stream of cooling water may be passed. The passages O of the adjacent sections may be serially connected by means of pipes P and Q flexibly jointed to each other in the manner indicated, or in any other suitable arrangement. Water may then be introduced at one end of the bed for all of the sections, and the sections may be separated or pressed together, and finished sections withdrawn and new rails introduced without interference with the circulating system.

It is proposed to economize time by providing a plurality of beds with means for maintaining one bed in operation under the roll while supplying the other bed with the material to be rolled. Fig. 5 illustrates this feature. The tracks R upon which the beds B reciprocate are extended in each direction beyond the roll a distance of approximately twice the length of one bed. A shaft S serves by means of rack and pinion connections on the under side of each bed to reciprocate it in the manner described in my aforesaid application. The two beds are provided with means for connecting them to or disconnecting them from each other, such for example as eyes T at their adjacent ends, adapted to receive removable links U. When the two beds are linked together, the rotation of the shaft S causes the pinions underneath the beds to move the two beds as one from one end to the other of the tracks R. When the two beds have been moved to one end, as in the example shown, the links U may be withdrawn, whereupon the rotation of the shaft S may be effected in the usual way to reciprocate the innermost bed B backward and forward under the roll A without disturbing the outermost bed B'. The latter is held stationary in proper position alongside the feeding apparatus V, which is also illustrated in detail in my aforesaid application. With this apparatus V, rails W are pushed into the grooves D at one end, and the finished flanged shapes X are forced out at the opposite ends; suitable tables will of course be provided. Before setting in operation the apparatus V however, the sections E should be loosened. In this figure I have shown the screws K as the sole means for pressing the sections together. In order to operate them all simultaneously and conveniently, they may be driven from a worm-shaft Y, which when the bed is at the end of its movement stands with its squared end Z opposite the squared socket $a$ of a power-shaft $b$, which is reciprocated by means of a lever $c$ to bring it into or out of engagement with the worm-shaft Y, and which is rotated by any suitable mechanism either forward or backward to press the sections E together, or to release them. The operation of the shaft B and of the mechanism V may be synchronized and arranged to automatically commence as soon as a bed B or B' reaches the corresponding end of the track.

Where it is desired to roll shorter lengths of rails or other elongated shapes the sections E may be made shorter than the base F, and the roll A may be provided with collars $c$ engaging the ends of the sections E and preventing longitudinal spreading of the ends of the rails being rolled, and also guiding the sections E. Where the sections E are less than half the width of the base F, two lines of sections may be arranged alongside of each other on the same principle, a collar $c$ being arranged on the roll between two lines of sections.

For use in connection with the lateral rolling system described, I have provided also a convenient mechanism for dividing the web of a rail longitudinally, so as to provide shapes of approximately T-section, which can be very conveniently rolled in the apparatus previously described into a great variety of shapes. Such an apparatus is shown in Fig. 7, where a roll A having a projecting edge $d$ is provided, and a bed $e$ is provided with a longitudinal groove $f$, at the sides of which the bed is shaped to accommodate the rail. The groove $f$ comes immediately under the web $g$ of the rail, and when the bed is passed under the roll the beveled edge $d$ of the roll passes through the web and divides the rail into two parts, which fall away from each other when the separation is completed.

For certain purposes, especially for forming railway cross ties out of old rails, it is desirable to provide a concave flange. My improved lateral rolling mill is particularly adapted for this purpose, it being only necessary to provide the formers E or corresponding portions of the bed with a concave face $h$ upon which the head $j$ of the rail rests. The rail C is arranged parallel with the roll, and is held thereunder in a fixed position, the roll being oscillated in the manner indicated by the arrows, and being gradually lowered by any usual or suitable mechanism such as is common for adjusting the heights of rolls. The metal of the head $j$ is forced up the inclined surface $h$ in first one direction and then the other, and finally assumes the shape of a concave flange, as shown in dotted lines.

As shown in Fig. 9, the formers E or equivalent parts of the bed, may be provided with shoulders $k$ of such depth and at such distance from the edge of the former as to properly limit the lateral flow of the metal, and to determine a perfectly straight edge for the flange. In the example shown the head $j$ of the rail is rolled in the manner previously described first in one direction and then in another, until it occupies the position shown in dotted lines at $j'$.

The standards $l$ for the roll are indicated in Fig. 3, to show the extreme position of the bed relatively thereto, and to indicate the possibility of feeding rails to the groove D through the space between the two standards. However the bed may be moved more or less beyond the roll to facilitate such feeding of rails thereto, as indicated in Fig. 5.

The mechanism for setting up the sections or bringing them together and releasing them, may be very conveniently controlled by one or more cams or other devices operated automatically by the movement of the bed. For example as shown in Fig. 10, the slide $F^2$ may be extended beyond the side of the bed and formed into a cam $m$, which as the bed is moved under the roll will strike the standard $l$, and will throw the slide $F^2$ inward to the dotted position and operate the toggle links G to press the sections together in the manner previously explained.

The releasing of the sections may be accomplished by merely striking the opposite end of the slide $F^2$ with a sledge to swing the toggle links to the position of Fig. 10. Or a pair of devices may be arranged to throw the slide in one or the other direction according to which one of the devices is in operative position. For example in Figs. 11, 12 and 13 a pair of cams $M'$ $M^2$ is provided, each of which is arranged on one of the standards at opposite sides of the bed. The cams slide up and down on the faces of the standards $l$ and are connected by a lever $n$ arranged a sufficient distance below the bed B to be clear of the same. When the lever $n$ stands in the middle or horizontal position shown, neither of the cams is in operative position, and the bed may be freely reciprocated past them. However if either of the cams is lowered it will strike the end of the slide $F^2$, which for this purpose projects sufficiently above the rest of the bed B, and will throw the slide to one side or the other to press the sections together or to release them. The cams may be held in position in any suitable manner. For example the cam $M^2$ may be made heavier than the cam $M'$ so as to press the latter upward, and the cam $M'$ may carry a handle $o$ projecting around to the side of the standard $l$ and adapted to engage any one of the three notches in the plate $p$ so as to hold the cam $M'$ in its raised, middle or lowered position, and to hold the cam $M^2$ alternatively in its lowered, middle or raised position.

As stated above, a mechanism may be provided at each end of the bed for pressing the sections together, and in such case each of the two pairs of standards $l$ may be fitted with a pair of cams $M'$ $M^2$, and these may be connected to operate together or independently as desired. Then by running the bed in one direction until one end is adjacent to the standards $l$, the mechanism at this end will be set up, and by running the bed back until the opposite end is adjacent to its standards, said opposite end will also be set up, completing the desired movement of the sections toward each other. Instead of the bolts K for adjusting the movement of the setting up mechanism, liners of suitable thickness may be placed back of the slide $F^2$ with substantially the same result, or any other adjusting means may be provided.

I have found by extensive experiments that a certain degree of curvature upon the flange which is formed in my improved mill may be obtained without the use of the curved face $h$ (Fig. 8), using the type of mill illustrated in Figs. 1 and 2. The flange formed by the usual lateral rolling described will have a certain degree of concavity, as indicated in dotted lines at $q$, provided a space $r$ be left beneath the base of the rail so that there is practically no support immediately under the center of the flange which is being rolled.

Though I have described with great particularity of detail certain specific embodiments of my invention, yet it is not to be understood therefrom that the invention is limited to the specific embodiments disclosed. Various modifications thereof in detail and in the arrangement and combination of the parts may be made by those skilled in the art, without departure from the invention.

What I claim is:—

1. A rolling mill for forming or spreading flanges upon a plurality of elongated shapes simultaneously, including in combination a number of separable sections adapted to hold such a shape in each of the spaces between the successive sections and in a position transverse to the path of movement, and means independent of the roll for pressing said sections together.

2. A rolling mill for forming or spreading flanges upon a plurality of elongated shapes simultaneously, including in combination a number of separable sections adapted to hold such a shape in each of the spaces between the successive sections and in a position transverse to the path of movement, a device for moving said sections a fixed distance to bring them together, and adjusting means for adjusting the position to which said sections are moved by said device.

3. A rolling mill for forming or spreading flanges upon a plurality of elongated shapes simultaneously, including in combination a number of separable sections adapted to hold such a shape in each of the spaces between the successive sections and in a position transverse to the path of movement, and adjusting screws K for adjustably pressing said sections together.

4. A rolling mill including in combination a roll, a plurality of beds, and means for maintaining one bed in operation in connection with said roll while supplying the other with the material to be rolled.

5. A rolling mill including in combination a roll, a plurality of beds, means for reciprocating one bed beneath said roll, and means for simultaneously emptying the other bed and resupplying it with material to be rolled.

6. A rolling mill including in combination a roll A, a plurality of beds B adapted to be connected to and disconnected from each other, a track upon which said beds pass beneath said roll, means at each end of said track for supplying one of said beds with material to be rolled, and means for simultaneously reciprocating the other bed beneath the roll.

7. A rolling mill for forming or spreading a flange upon an elongated shape, including a roll having a collar, and a bed adapted to hold such a shape in a position transverse to the path of movement, a side edge of said bed being engaged by said collar to prevent longitudinal spreading of the ends of the rails.

8. A rolling mill including in combination a movable bed having separable sections for holding a shape in position, and means controlled by the movement of said bed for pressing said sections together.

9. A rolling mill including in combination a movable bed having separable sections for holding a shape in position, mechanism for pressing said sections together, and a cam arranged to be brought into operation by the movement of said bed for operating said pressing mechanism.

10. A rolling mill including in combination a movable bed having separable sections for holding a shape in position, mechanism controlled by the movement of said bed for pressing said sections together or releasing them, and controlling devices for said mechanism adapted to be brought alternatively into operative position to actuate said mechanism in opposite directions respectively.

In witness whereof, I have hereunto signed my name in the presence of two subscribing witnesses.

JAMES E. YORK.

Witnesses:
  DOMINGO A. USINA,
  THEODORE T. SNELL.